United States Patent
Caruso et al.

(10) Patent No.: US 9,719,491 B2
(45) Date of Patent: Aug. 1, 2017

(54) SYSTEMS FOR MINIMIZING YAW TORQUE NEEDED TO CONTROL POWER OUTPUT IN TWO-BLADED, TEETERING HINGE WIND TURBINES THAT CONTROL POWER OUTPUT BY YAWING

(75) Inventors: Silvestro Caruso, London (GB);
Martin Jakubowski, London (GB);
Luciano Caioli, London (GB)

(73) Assignee: Condor Wind Energy Limited, London (GB)

( * ) Notice: Subject to any disclaimer, the term of this patent is extended or adjusted under 35 U.S.C. 154(b) by 767 days.

(21) Appl. No.: 14/116,078

(22) PCT Filed: May 4, 2012

(86) PCT No.: PCT/IB2012/002704
§ 371 (c)(1),
(2), (4) Date: Apr. 9, 2014

(87) PCT Pub. No.: WO2013/027127
PCT Pub. Date: Feb. 28, 2013

(65) Prior Publication Data
US 2014/0241882 A1    Aug. 28, 2014

Related U.S. Application Data

(60) Provisional application No. 61/483,397, filed on May 6, 2011.

(51) Int. Cl.
*F01D 7/00* (2006.01)
*F03D 7/02* (2006.01)
(Continued)

(52) U.S. Cl.
CPC ......... *F03D 7/0204* (2013.01); *F03D 1/0658* (2013.01); *F03D 1/0691* (2013.01);
(Continued)

(58) Field of Classification Search
CPC .... F03D 7/0204; F03D 7/0212; F03D 7/0268; F03D 7/028; F03D 7/042; F03D 1/0658; F03D 1/0691; Y02E 10/721; Y02E 10/723
See application file for complete search history.

(56) References Cited

U.S. PATENT DOCUMENTS 4,435,646 A    3/1984  Coleman et al.
4,439,105 A    3/1984  Hohenemser
(Continued)

FOREIGN PATENT DOCUMENTS

CN    201771692 U    3/2011
DE    20205396 U1    11/2002
(Continued)

OTHER PUBLICATIONS

Carlin et al., 2001, The History and State of the Art of Variable-Speed Wind Turbine Technology, National Renewable Energy Laboratory, (68 pages).
(Continued)

*Primary Examiner* — Jessica Cahill
(74) *Attorney, Agent, or Firm* — Themis Law

(57) ABSTRACT

Systems and methods for increasing operational efficiency of wind turbines, especially offshore wind turbines. The invention discloses systems and methods for reducing the torque needed to rotate a rotor shaft axis with respect to the wind direction. Systems and methods for controlling the rotational speed of the rotor shaft axis are also disclosed.

16 Claims, 4 Drawing Sheets

(51) Int. Cl.
*F03D 1/06* (2006.01)
*F03D 7/04* (2006.01)

(52) U.S. Cl.
CPC ........... *F03D 7/028* (2013.01); *F03D 7/0212* (2013.01); *F03D 7/0268* (2013.01); *F03D 7/042* (2013.01); *F05B 2240/2022* (2013.01); *Y02E 10/721* (2013.01); *Y02E 10/723* (2013.01)

(56) References Cited

U.S. PATENT DOCUMENTS

| | | | |
|---|---|---|---|
| 4,565,929 | A | 1/1986 | Baskin et al. |
| 4,703,189 | A | 10/1987 | DiValentin et al. |
| 4,815,936 | A | 3/1989 | Stoltze et al. |
| 6,361,275 | B1 | 3/2002 | Wobben |
| 6,420,795 | B1 | 7/2002 | Mikhail et al. |
| 8,749,084 | B2 * | 6/2014 | Gjerlov .............. F03D 7/0204 290/44 |
| 2002/0047277 | A1 | 4/2002 | Willis et al. |
| 2003/0068104 | A1 | 4/2003 | Loftus |
| 2004/0151584 | A1 | 8/2004 | Blakemore |
| 2006/0070435 | A1 | 4/2006 | LeMieux et al. |
| 2008/0112807 | A1 * | 5/2008 | Uphues .............. F03D 7/0224 416/1 |
| 2009/0317250 | A1 * | 12/2009 | Gamble .............. F03D 1/0658 416/1 |
| 2010/0133827 | A1 | 6/2010 | Huang et al. |
| 2010/0203983 | A1 | 8/2010 | Stites |
| 2010/0226772 | A1 | 9/2010 | Deering |
| 2011/0268568 | A1 * | 11/2011 | Scholte-Wassink .. F03D 7/0204 416/1 |
| 2013/0134711 | A1 * | 5/2013 | Spruce .............. F03D 7/0224 290/44 |
| 2014/0212288 | A1 | 7/2014 | Jakubowski et al. |
| 2014/0217238 | A1 | 8/2014 | Jakubowski et al. |
| 2014/0217742 | A1 | 8/2014 | Caruso et al. |
| 2014/0219796 | A1 | 8/2014 | Caruso et al. |
| 2014/0226926 | A1 | 8/2014 | Caruso et al. |

FOREIGN PATENT DOCUMENTS

| | | |
|---|---|---|
| EP | 0995904 A2 | 4/2000 |
| EP | 1134410 A1 | 9/2001 |
| EP | 1890034 A1 | 2/2008 |
| EP | 2128431 A2 | 12/2009 |
| EP | 2302206 A1 | 3/2011 |
| GB | 2107794 A | 5/1983 |
| JP | 2006-207502 A | 8/2006 |
| WO | 02/079647 A1 | 10/2002 |
| WO | 2009/080047 A2 | 7/2009 |
| WO | 2009/132671 A2 | 11/2009 |
| WO | 2010/072190 A2 | 7/2010 |
| WO | 2010/128378 A2 | 11/2010 |
| WO | 2011/042369 A2 | 4/2011 |
| WO | 2012/150502 A1 | 11/2012 |
| WO | 2012/150502 A4 | 11/2012 |
| WO | 2012/153185 A1 | 11/2012 |
| WO | 2012/153197 A2 | 11/2012 |
| WO | 2012/153197 A3 | 11/2012 |
| WO | 2012/153197 A4 | 11/2012 |
| WO | 2012/160446 A2 | 11/2012 |
| WO | 2012/160446 A3 | 11/2012 |
| WO | 2012/160446 A4 | 11/2012 |
| WO | 2012/164387 A1 | 12/2012 |
| WO | 2012/164387 A4 | 12/2012 |
| WO | 2013/027127 A4 | 12/2012 |
| WO | 2013/027127 A2 | 2/2013 |

OTHER PUBLICATIONS

IEA Wind 1989 Annual Report.
IEA Wind 1990 Annual Report.
IEA Wind 1992 Annual Report.
IEA Wind LS WECS 1988 Annual Report.
IEA Wind LS WECS 1989 Annual Report.
International Preliminary Search Report on Patentability for PCT/IB2012/001015 with the date of issuance of Nov. 12, 2013, (8 pages).
International Preliminary Search Report on Patentability for PCT/IB2012/001041 with the date of issuance of Nov. 5, 2013, (14 pages).
International Preliminary Search Report on Patentability for PCT/IB2012/001106 with the date of issuance of Dec. 2, 2013, (10 pages).
International Preliminary Search Report on Patentability for PCT/IB2012/001118 with the date of issuance of Nov. 26, 2013, (13 pages).
International Preliminary Search Report on Patentability for PCT/IB2012/001183 with the date of issuance of Nov. 12, 2013, (14 pages).
International Preliminary Search Report on Patentability for PCT/IB2012/002704 with the date of issuance of Nov. 12, 2013, (15 pages).
Wind Stats Report 2011.

* cited by examiner

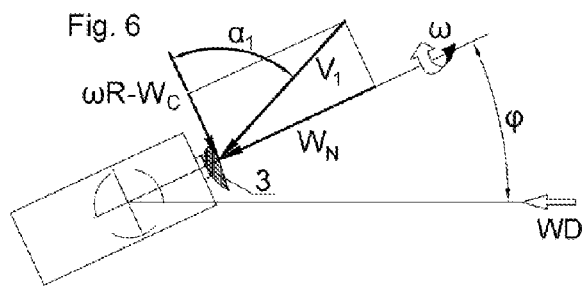
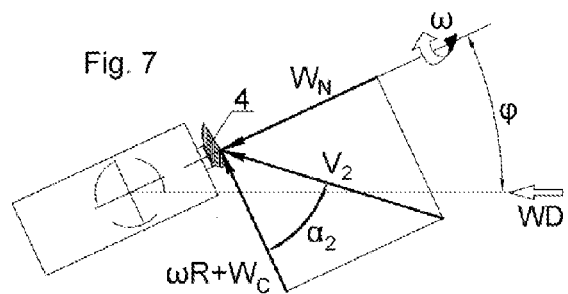
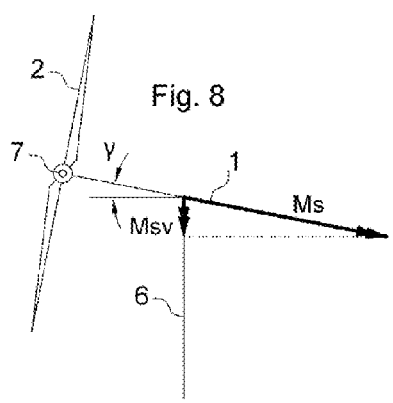
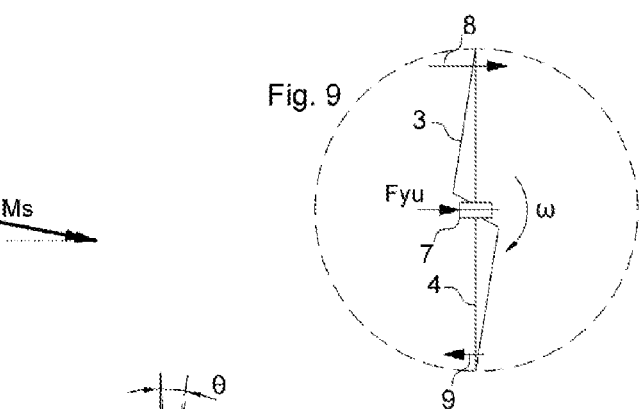
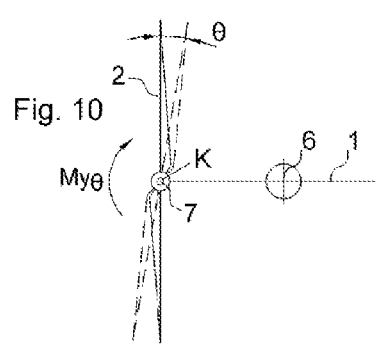

SYSTEMS FOR MINIMIZING YAW TORQUE NEEDED TO CONTROL POWER OUTPUT IN TWO-BLADED, TEETERING HINGE WIND TURBINES THAT CONTROL POWER OUTPUT BY YAWING

STATEMENT OF RELATED APPLICATIONS

This application claims priority to U.S. Provisional Application No. 61/483,397 filed May 6, 2011, which is incorporated by reference herein in its entirety.

FIELD OF THE INVENTION

The invention relates to systems and methods for increasing the operational efficiency of yaw control wind turbines.

BACKGROUND

Most three-bladed and two-bladed turbines are equipped with a yaw system to be able to change the orientation of the rotor axis in order to follow the wind direction and ensure that the rotor faces into the wind. Most three-bladed and two-bladed turbines modulate the pitch of the rotor blades to control the speed of the turbine and hence the power output of the turbine, as well as for shutdown.

In two-bladed wind turbines, it is possible to yaw the turbine into or out of the wind also to control the speed of the turbine, and hence the power output of the turbine, without any need of pitch control. This is possible where the two-bladed turbine uses a teetering hinge (or "see-saw" hinge) to attach the turbine blades to the drive train of the turbine. The teetering hinge gives the rotor an additional degree of freedom, allowing the turbine to overcome gyroscopic forces, and to modulate the yaw angle sufficiently quickly to control the rotor speed of the turbine.

In turbines that use yaw control for controlling the running speed of the rotor, care must be taken to ensure that the teetering angle is controlled and kept within certain boundaries to avoid hitting the support structure and to ensure efficient dynamic performance of the rotor, particularly when undergoing fast yawing due to extreme wind conditions.

SUMMARY

This patent application discloses certain techniques for minimizing the necessary yaw torque as well as the amplitude of the teetering. This allows improved dynamic control and performance of the rotor, the yawing system, and the teetering hinge, leading to improved performance of the turbine. This, in turn, reduces the stresses on the yaw system and teetering hinge, and leads to greater reliability and design improvements to the turbine. It also improves the safety of the turbine in extreme wind conditions.

The invention refers to two-bladed teetering hinge, yaw control, upwind turbines. In a two-bladed teetering hinge, yaw control wind turbine, the power is controlled by yawing the rotor out of the wind when the wind speed is higher than rated. The invention relates mainly to systems for reducing the torque necessary to turn the nacelle around the tower axis when a fast change of yaw angle is required for power control or a fast yawing is required for shutdown by bringing the rotor axis at 90 degrees from wind direction. The invention discloses systems for controlling the direction the yaw angle is changed based upon measurements of rotor shaft speed, wind direction and direction of the rotor axis.

For wind speed not higher than the rated, the turbine is operating into the wind (rotor axis aligned with the wind direction), thus the system has the role of following the wind direction. When the wind is higher than the rated the rotor axis is yawed to keep constant the wind speed component perpendicular to the rotor disk, thus the yaw system has the role to control the rotor running speed, while the rotor torque is controlled by other means (ex: electrical generator and power converter).

In two-bladed, teetering hinge, yaw control turbines, the blades are rigidly jointed to the hub, and the latter is coupled to the shaft through a hinge whose axis is perpendicular to the shaft axis. The degree of freedom introduced by the hinge, although this has a torsional stiffness≠0, dramatically reduces the gyroscopic loads of the turbine; thus the yaw torque needed to actuate the necessary yaw rate, and consequent acceleration, is limited. Further reduction of the yaw torque is achievable by a proper combination between the position of an up-wind rotor in respect to the wind direction and the direction of the shaft running speed.

The disclosed systems will reduce the amount of torque needed to rotate the shaft axis even at high yaw rate, which results also in reduced loads charging the overall turbine system during the yawing maneuver and an increase in yaw motors lifetime. The invention is especially useful for large turbines (e.g., greater than 1 MW) where the nacelle housing can weigh several thousand kilograms.

The teetering behavior of the running rotor is such that when the two blades are around their vertical position (azimuth angle=0), the teetering angle is always little, while it reaches the max value when the blades are horizontal. The disclosed system also will reduce further the teetering angle for blades around the zero azimuth, thus allowing the reduction of the hub overhang (that is the distance of the hub from the tower axis) which is necessary to secure the right clearance blade tip-tower in extreme situation.

In one instance, a system of the invention includes a central processing unit (CPU), an actuation yawing system (to turn the turbine around the tower), a rotor shaft running speed sensor, a wind relative direction sensor (in respect to the turbine axis direction), a sensor of the rotor axis direction in respect to the tower (absolute direction).

The yaw actuation system is capable to change the rotor axis direction clockwise or counterclockwise (as viewed from above, i.e., as viewed looking down from above the nacelle) by applying a yawing torque between the bedplate of the rotor shaft and the beneath tower, through yawing motors.

The rotor running direction characterizing a turbine derives from the specific design of the rotor and the electrical generator. Generally an upwind rotor is designed to run CW when it is seen from the coming wind direction. The invented system however is applicable also to the case in which the rotor is designed to run CCW.

The systems and methods of the invention are useful also in shutdown, when the turbine is parked with the rotor axis oriented at 90 deg from the wind direction and shall be kept in this position: a small yaw torque needed to correct the position of the nacelle for any change of wind direction is of great advantage.

BRIEF DESCRIPTION OF THE DRAWINGS

FIG. 6 shows the angle of attack of the upper blade when, with rotor yawed out of the wind, the wind hits the blade with an angle φ.

FIG. 7 shows the angle of attack of the lower blade when, with rotor yawed out of the wind, the wind hits the blade with an angle φ.

FIG. 8 illustrates an inclination of the rotor axis from horizontal, resulting in an additional yaw moment.

FIG. 9 illustrates conceptually the in plane forces on the blades of a two-bladed teetering hinge rotor when spinning clockwise and the rotor axis has been yawed CCW away from the wind.

FIG. 10 illustrates the teetering displacement on a turbine rotor as viewed from above, with the blades horizontally oriented.

DETAILED DESCRIPTION

Figure 1:
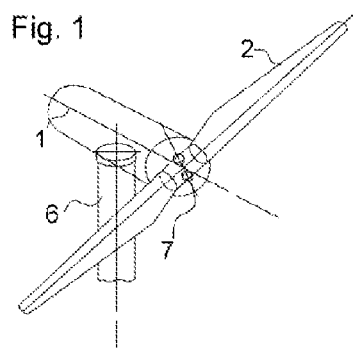
FIG. 1 shows a generalized schematic of a two-bladed, teetering hinge wind turbine.

The invention relates, generally, to two-bladed, teetering hinge, yaw control wind turbines. These turbines, when the wind speed is lower than rated, are controlled by keeping the rotor into the wind and by modulating the shaft restraining torque in order to maintain the optimal tip speed ratio (that is the ratio between the peripheral speed of the blade tip and the wind speed). The rotor is kept into the wind by the yawing system which is actuated by the turbine controller (CPU). The rotor restraining torque is modulated by other means (i.e., an electrical power converter coupled to the turbine electrical generator, with proper controller subordinated to the turbine controller).

When the wind speed is higher than rated, while the rotor torque is kept "constant" at its rated value, the rotor running speed is kept "constant" at its rated value by yawing always the rotor axis from the wind direction and by changing the rotor axis direction towards the wind direction, for wind speed decreasing, or from the wind direction, for wind speed increasing. In a two-bladed, teetering hinge rotor, the yawing torque necessary to change the rotor axis direction is limited by virtue of the teetering hinge that decouples the gyroscopic loads of the turbine system.

The lower the yawing torque necessary to change the direction of the rotor axis, the faster can be the resulting yaw rate, thus the performance of the power control. For shutdown, the rotor axis is yawed (moved) to get 90 deg from the wind direction. The highest yaw rate is required for shutdown.

The necessary yawing torque tends to increase in relation to the actual yaw angle, that is the angle between the wind direction and the rotor axis direction, at which the turbine is operating; and the higher is the average wind speed, the higher is the necessary yaw angle. The yaw angle is zero deg with the wind speed below the rated, 60 deg with the wind speed at cut-out, 90 deg at shut down. Thus, in respect to the wind direction, the turbine is asked to operate with the rotor axis direction lying between 0 deg and 90 deg of the same quadrant, while the absolute direction of the rotor axis depends on the absolute wind direction.

Beyond the beneficial effect of the teetering hinge, the yawing torque can be further reduced by coordinating the direction of the rotor running speed and the quadrant in which the rotor is operating in respect to the wind direction. This coordination leads also to a reduction of the teetering amplitude, mainly when the two blades are oriented vertically, and this allows to limit the hub overhang, dictated by the necessary clearance between the blade tip and the tower of upwind turbines.

The invention discloses systems and methods to minimize the yaw torque needed to control by yawing a two-bladed, teetering hinge turbine.

Typically the sensors necessary to control the turbine by yawing are:
 shaft running speed sensor (i.e., pick-up);
 rotor axis absolute direction sensor (i.e., encoder between the drive train bedplate and the tower);
 wind relative direction sensor (i.e., wind direction vane supported by the turbine roof);

No wind speed sensor is necessary to control the power by yawing; it is necessary only to shutdown the turbine for wind speed below the cut-in and above the cut-out and to allow operation with wind speed higher than the cut-in and lower than the cut-out.

A generalized schematic of a two-bladed, teetering hinge rotor attached via a nacelle atop a tower is shown in FIG. 1.

Figure 2:
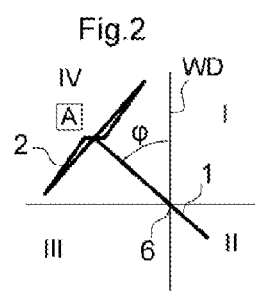
FIG. 2 shows a generalized schematic of a two-bladed, teetering hinge wind turbine seen from above, with the rotor position oriented in the quadrant IV, thus CCW from the coming wind direction WD.
Figure 3:
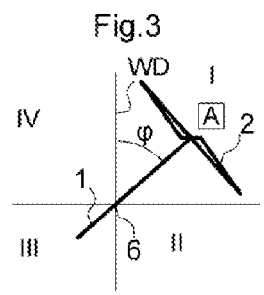
FIG. 3 shows a generalized schematic of a two-bladed, teetering hinge wind turbine seen from above, with the rotor position oriented in the quadrant I, thus CW from the coming wind direction WD.

FIGS. 2 & 3 show the rotor seen from above (that is from the top to bottom of the turbine). In FIG. 2 the rotor is operating in the quadrant IV, that is, between 12 o'clock and 9 o'clock with the wind direction WD blowing from 12 o'clock; in FIG. 3 the rotor is operating in the quadrant I, that is, between 12 o'clock and 3 o'clock. It was found that in order to minimize the necessary yaw torque for power control, in the case of FIG. 2 the rotor seen from A must run CW; in the case of FIG. 3, the rotor must run CCW.

Figure 4:
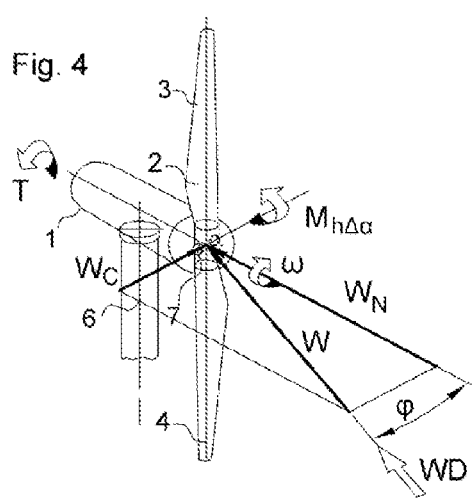
FIG. 4 shows wind speed vectors and angles associated with a blade vertically oriented above the rotor shaft, spinning clockwise, when the rotor shaft has been yawed counterclockwise away from the wind by an angle φ.

The rotor rotation direction is dictated by the choices regarding the design of the rotor. FIG. 4 shows the rotor 2 operating in the quadrant IV, CW running, with the blades in vertical position. The rotor 2 includes a top blade 3, a bottom blade 4, and a teetering hinge 7. The rotor spins with an angular velocity ω. When the rotor axis is moved out of the wind by an angle φ, the incident wind vector W is divided along the normal component $W_N$ and the cross component $W_C$. In yaw controlled turbines, the yaw control system is used to adjust the angle φ to keep the rotor shaft speed at rated value, while the retaining torque T is kept at its rated value by the electrical generator and associated means (i.e., power converter). As the wind speed increases or decreases, φ is adjusted to keep the wind normal $W_N$ constant. Typically, φ may range from 0 to 60 degrees, on average. The angle of 60 deg corresponds to an average wind speed close to cut-out. During the transients due to the variability of wind speed and direction, however, φ may reach values higher than 60 deg without causing instability. In shut down φ is increased to 90 deg at which value no or a little negative aerodynamic torque is generated by the wind, thus allowing the rotor to come to stop. At wind speeds below the rated, the same control system keeps the yaw angle ϕ around 0, or directly aligned with the wind in order to maximize energy production.

Figure 5:
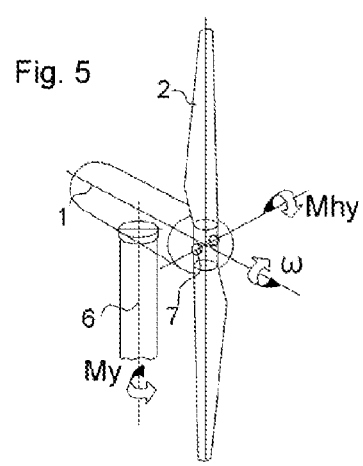
FIG. 5 shows the direction of the teetering hinge retaining torque associated to the direction of the active yaw torque, while the rotor is running CW seen from the coming wind direction.

Considering the rotor in quadrant IV, clockwise running of FIG. 4, the cross component $W_C$ results in a different angle of attack for the top blade 3 (moving with $W_C$) than for the bottom blade 4 (moving against $W_C$). This generates different loads on the two blades 3 and 4, and, in turn, generates a restraining moment $M_{hΔα}$ around the teetering hinge 7, acting in the direction of moving the bottom blade from the tower. The higher is ϕ, the higher is $M_{hΔα}$. As yaw torque $M_y$ is applied to the rotor shaft via the nacelle 1 (e.g., via the baseplate of the nacelle), the gyroscopic effect of the rotor generates a hinge moment, $M_{hy}$, as shown in FIG. 5. The direction of $M_{hy}$ depends on the direction of the yaw moment $M_y$ and on the direction of the rotor rotation. The greater the yaw torque, the greater the hinge moment.

In the case of a rotor running clockwise, operating in quadrant IV, as shown in FIG. 5, a yaw torque resulting in an angular displacement ϕ of the rotor shaft axis in a counterclockwise direction (condition occurring typically in shutdown) will result in counter-acting restraining ($M_{hΔα}$) and hinge ($M_{hy}$) moments. Consequently for counterclockwise yawing, which occurs for power control, and for shutdown at higher yaw rate and higher yaw torque, the resultant teetering amplitude is reduced.

The differences in the angles of attack for the top blade 3 and the bottom blade 4 are shown in more detail in FIGS. 6 and 7. FIG. 6 shows the normal wind speed $W_N$, the cross wind speed $W_C$, and the peripheral speed ωR at the tip of the top blade 3. In the case of the top blade 3, $W_C$ and ωR are in opposite directions, resulting in an angle of attack $α_1$. On the contrary, the bottom blade 4 (FIG. 7) sees an angle of attack $α_2$ due to the additive effects of $W_C$ and ωR. The differences in angles of attack, although the favorable difference in magnitude of the resultant vector $V_1$ and $V_2$, results in aerodynamic load unbalancing between the blades, and causes an increase in teetering amplitude (or strain in a blade that does not have a teetering hub).

In addition to the wind vectors and the rotary speed of the blades discussed in FIGS. 6-7, other forces and moments concur to give the resulting yaw torque necessary to actuate a yaw angle change. The other forces and moments are: the vertical component of the shaft torque, acting on the nacelle around the yaw axis; the lateral force of the rotor wind actions, acting on the rotor hub; the teetering restraining torque corresponding to the teetering angle when the blades are almost in horizontal position; and the yaw torque corresponding to the wanted yaw acceleration.

As shown in FIG. 8, rotor shafts are often given a slight elevation of y to increase the clearance between the rotor and the tower. The vertical component $M_{SV}$ of the shaft torque $M_S$ (of a rotor clockwise running) acts in a clockwise direction around the tower axis and will have to be accounted for in calculations of the torque needed to change the angle ϕ of the shaft axis with respect to the tower.

As shown in FIG. 9, when a clockwise running rotor shaft is operating in quadrant IV, the difference between the top blade in plane load 8 and the bottom blade in plane load 9 results in a lateral force $F_{yu}$ at the hub of the rotor 7. The averaged value of the lateral force causes a restraining yaw moment component which counteracts the vertical component $M_{SV}$ of the shaft torque $M_S$ (i.e., as shown in FIG. 8), thus reducing the average yaw torque necessary to change the yaw angle.

As said above, the max teetering angle θ is reached with the blades around the horizontal position (FIG. 10). The corresponding teetering hinge restraining torque $M_{y0}$, which is just equal to the teetering angle θ times the torsional stiffness K, is a component of the yaw torque necessary to change the yaw angle ϕ. The torque due to the needed yaw acceleration is little as the rotor mass works as a quasi-punctual mass located at the "hub" (i.e., at the teetering hinge 7 of FIG. 10) and not as a rigid disk.

When systems of the invention are employed, the max torque necessary to yaw the nacelle is actually reduced, and the teeter angle is also reduced, mainly when the blades are around the vertical position. The order of magnitude of the yaw torque reduction obtained by the systems of the present invention is 50%.

Figure 11:
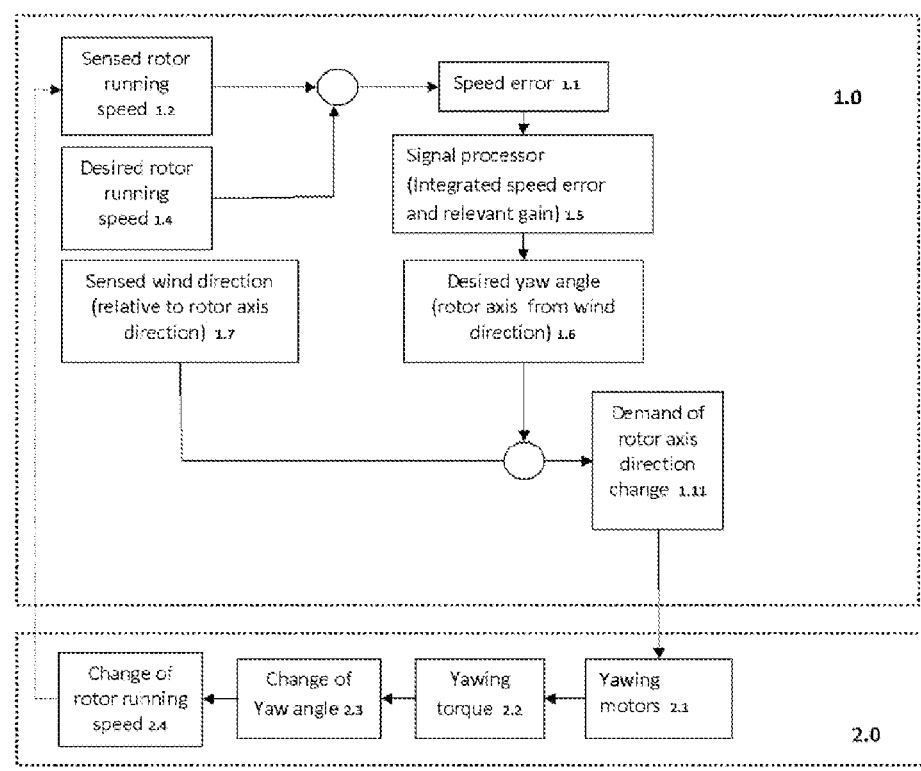
FIG. 11 shows a schematic control system for executing the invention.

In a simplest embodiment of the system, the control of the rotor running speed of a two-bladed, teetering hinge, yaw control upwind turbine is shown in FIG. 11. FIG. 11 refers to a rotor which is designed and mounted to run CW if seen from the coming wind (see e.g., ref. A of FIG. 2) and describes the control modalities of the rotor running speed when the wind speed is higher than the rated speed and thus the rotor must be yawed out of the wind by an angle ϕ that is modulated in respect to the variation of the wind in speed and direction.

The system is composed by the controller (e.g., a CPU) 1.0 and the yawing actuation system 2.0. The controller receives the signal from the rotor running speed sensor (sensors) 1.2. The desired rotor running speed 1.4 is a set point of the controller. The actual rotor running speed 1.2 and the desired rotor running speed 1.4 are compared and the relevant speed error 1.1 is integrated by the processor 1.5 to give the desired CCW yaw angle 1.6 (that is the desired angle between the rotor axis direction and the wind direction, with the rotor axis direction rotated CCW from the wind direction, according to FIG. 2). The controller receives from the wind direction sensor (sensors) the actual relative angle between the wind direction and the nacelle (rotor axis direction) 1.7. The comparison between the values 1.6 and 1.7 gives the value of the demanded rotor axis direction change 1.11 (that is the change of the absolute angle of the nacelle, which is aligned with the rotor axis direction, and the tower).

If the value 1.11 is positive, the yaw actuation system 2.0 commands the yawing motors 2.1 to turn the nacelle CCW. If the value 1.11 is negative, the yaw actuation system 2.0 commands the yawing motors 2.1 to turn the nacelle CW. The yawing motors 2.1 generate a yawing torque 2.2 which effect is a change of the yaw angle 2.3. Consequently, the rotor speed 2.4 will change, thus the sensed rotor speed 1.2 changes to reach the desired rotor running speed 1.4 and the speed error 1.1 is nullified.

Figure 12:
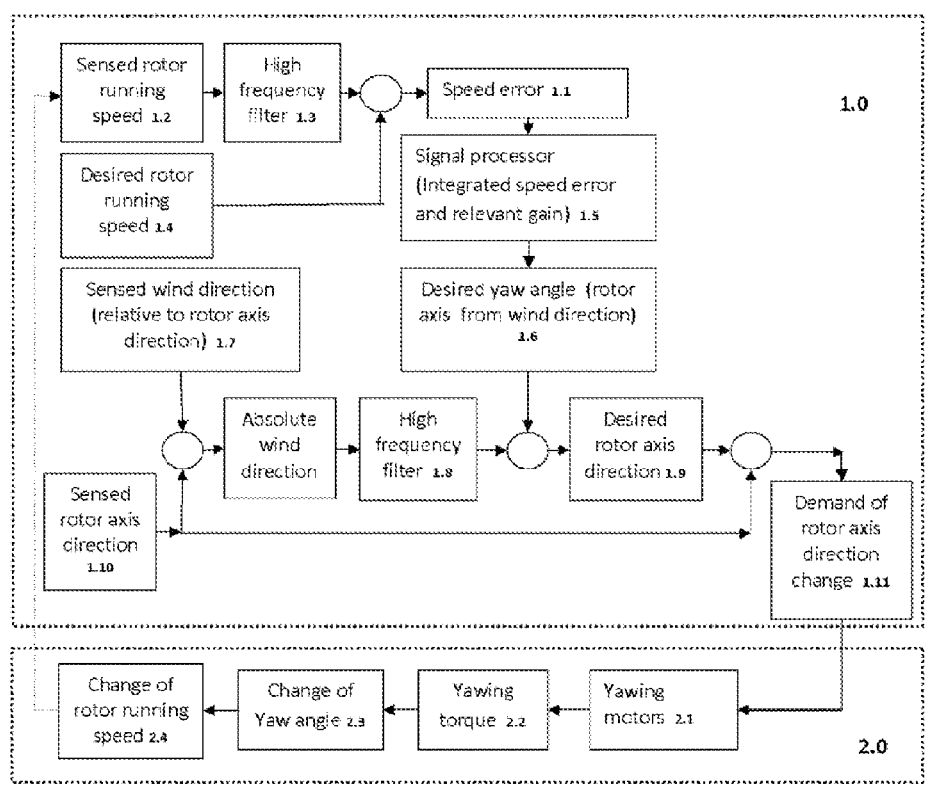
FIG. 12 shows a schematic more complete control system of the invention.

In an alternative embodiment of the system, the control of the rotor running speed of a two-bladed, teetering hinge, yaw control upwind turbine is shown in FIG. 12. The figure refers to a rotor which is designed and mounted to run CW if seen from the coming wind (see e.g., ref. A of FIG. 2) and describes the control modalities of the rotor running speed when the wind speed is higher than the rated speed and thus the rotor must be yawed out of the wind by an angle that is modulated in respect to the variation of the wind in speed and direction.

The system is composed by the controller (e.g., a CPU) 1.0 and the yawing actuation system 2.0. The controller receives the signal from the rotor running speed sensor (sensors) 1.2. The desired rotor running speed 1.4 is a set point of the controller. The actual rotor running speed 1.2, optionally filtered by the high frequency filter 1.3, and the desired rotor running speed 1.4 are compared and the relevant speed error 1.1 is integrated by the processor 1.5 to give the desired CCW yaw angle 1.6 (that is the desired angle between the rotor axis direction and the wind direction, with the rotor axis direction rotated CCW from the wind direction, according to FIG. 2). The controller receives from the wind direction sensor (sensors) the actual relative angle between the wind direction and the nacelle (rotor axis direction) 1.7. The controller receives also the signal of the rotor axis absolute direction sensor 1.10. The controller compares the values 1.7 and 1.10 to obtain the absolute wind direction 1.12. The absolute wind direction, in case of high turbulence, can be filtered by the high frequency filter 1.8. The absolute filtered wind direction, compared with the desired yaw angle 1.6, gives the desired rotor axis direction 1.9. The difference of the sensed axis direction 1.10 and the desired rotor axis direction 1.9, gives the demand of the rotor axis direction 1.11 (that is the change of the absolute angle of the nacelle, alias rotor axis direction, and the tower).

If the value 1.11 is positive, the yaw actuation system 2.0 commands the yawing motors 2.1 to turn the nacelle CCW. If the value 1.11 is negative, the yaw actuation system 2.0 commands the yawing motors 2.1 to turn the nacelle CW. The yawing motors 2.1 generate a yawing torque 2.2 which effect is a change of the yaw angle 2.3. Consequently the rotor speed 2.4 will change, thus the sensed rotor speed 1.2 changes to reach the desired rotor running speed 1.4 and the speed error 1.1 is nullified.

By using the described systems it is feasible to minimize the torque needed to adjust the yaw as well as the teetering amplitude for two-bladed, teetering hinge, yaw control wind turbines. Additional methods of carrying out the systems and methods of the invention will be apparent to those of skill in the art and are intended to be covered by the claims recited below.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for minimizing yaw torque needed to limit power output of an upwind two-bladed wind turbine with a teetering hinge, the turbine having a rotor designed to run clockwise, when seen from coming wind, and being housed in a nacelle atop a tower, the method comprising:
    yawing rotor axis counterclockwise, when seen from above the nacelle, away from wind direction to limit the power output for wind speeds higher than rated wind speed while rotor torque is kept at its rated value,
    wherein yawing the rotor axis reduces teetering amplitude of the blades, and
    wherein the teetering amplitude is reduced more when the blades are in a vertical position than when the blades are in a horizontal position.

2. The method of claim 1, wherein reducing the teetering amplitude with blades in the vertical position minimizes a hub overhang or maximizes clearance between blade tip and tower.

3. The method of claim 1, further comprising controlling the yawing with a central controller and a subordinated yawing actuation system.

4. The method of claim 3, wherein the central controller receives signals from a rotor speed sensor and a wind relative direction sensor.

5. The method of claim 3, wherein the central controller additionally filters out high frequency wind turbulence.

6. The method of claim 3, wherein the central controller compares an actual rated running speed with a desired running speed.

7. The method of claim 6, wherein the desired running speed is equal to the rated rotor running speed.

8. The method of claim 3, wherein the central controller calculates a desired yaw angle by integrating a speed error.

9. The method of claim 8, wherein the central controller compares the desired yaw angle to a sensed relative wind direction and calculates a direction for rotor axis change.

10. The method of claim 3, wherein the central controller commands the nacelle, as seen from above, to stay always in a predetermined direction of power limiting or shutdown with respect to the wind direction, relative to rotation of the rotor as defined in claim 1.

11. The method of claim 10, wherein for wind speeds higher than rated wind speed, if the rotor running speed increases beyond rated running speed while rotor torque is kept constant, then the central controller commands the yaw system to move the nacelle further in the predetermined direction of power limiting to limit the power output of the turbine.

12. The method of claim 10, wherein for wind speeds higher than rated wind speed, if the rotor running speed decreases below rated running speed while rotor torque is kept constant, then the central controller commands the yaw system to move the nacelle in a direction opposite to the predetermined direction of power limiting to maintain the power output of the turbine.

13. A method for minimizing yaw torque needed to limit power output of an upwind two-bladed wind turbine with a teetering hinge, the turbine having a rotor designed to run counterclockwise, when seen from coming wind, and being housed in a nacelle atop a tower, the method comprising:
    yawing rotor axis clockwise, when seen from above the nacelle, away from wind direction to limit the power output for wind speeds higher than rated wind speed while rotor torque is kept at its rated value,
    wherein yawing the rotor axis reduces teetering amplitude of the blades, and
    wherein the teetering amplitude is reduced more when the blades are in a vertical position than when the blades are in a horizontal position.

14. The method of claim 13, further comprising controlling the yawing with a central controller and a subordinated yawing actuation system.

15. The method of claim 13, wherein yawing the rotor axis reduces the teetering amplitude of the blades.

16. The method of claim 13, wherein reducing the teetering amplitude with blades in the vertical position minimizes a hub overhang or maximizes clearance between blade tip and tower.

* * * * *